(12) United States Patent
Kore et al.

(10) Patent No.: US 8,194,592 B2
(45) Date of Patent: Jun. 5, 2012

(54) WIRELESS MONITORING AND ALARM SYSTEM

(75) Inventors: Vinayak Sadashiv Kore, Kamataka (IN); Channabasavarai Raravi, Karnataka (IN); Mohammed Rizwan, Karnataka (IN); Ishware Bhat, Karnataka (IN); Andrew G. Berezowski, Wallingford, CT (US)

(73) Assignee: Honeywell International Inc., Morristown, NJ (US)

( * ) Notice: Subject to any disclaimer, the term of this patent is extended or adjusted under 35 U.S.C. 154(b) by 548 days.

(21) Appl. No.: 12/354,498

(22) Filed: Jan. 15, 2009

(65) Prior Publication Data

US 2010/0177684 A1 Jul. 15, 2010

(51) Int. Cl.
*H04W 4/00* (2009.01)

(52) U.S. Cl. ......................................... 370/328

(58) Field of Classification Search .................. 370/203, 370/204–215, 229–240, 241–253, 310–337, 370/338–350, 395.1, 395.3, 395.4, 395.41, 370/395.42, 395.5, 395.52, 395.53, 412–421, 370/431–457, 458–463, 464–497, 498–529
See application file for complete search history.

(56) References Cited

U.S. PATENT DOCUMENTS

| | | | | |
|---|---|---|---|---|
| 5,483,222 A | * | 1/1996 | Tice | 340/518 |
| 6,163,263 A | * | 12/2000 | Tice et al. | 340/635 |
| 6,192,230 B1 | | 2/2001 | van Bokhorst et al. | |
| 7,505,450 B2 | * | 3/2009 | Castagnoli | 370/350 |
| 7,675,863 B2 | * | 3/2010 | Werb et al. | 370/241 |
| 7,675,884 B2 | * | 3/2010 | Ye | 370/329 |
| 7,701,858 B2 | * | 4/2010 | Werb et al. | 370/241 |
| 7,738,413 B2 | * | 6/2010 | Varaiya et al. | 370/321 |
| 7,899,027 B2 | * | 3/2011 | Castagnoli et al. | 370/350 |
| 7,903,653 B2 | * | 3/2011 | Lee et al. | 370/390 |
| 7,978,725 B2 | * | 7/2011 | Gong et al. | 370/445 |
| 8,005,002 B2 | * | 8/2011 | Gandham et al. | 370/252 |
| 2005/0122231 A1 | * | 6/2005 | Varaiya et al. | 340/870.01 |
| 2005/0159152 A1 | | 7/2005 | Tice et al. | |
| 2006/0187866 A1 | * | 8/2006 | Werb et al. | 370/311 |
| 2006/0215581 A1 | * | 9/2006 | Castagnoli | 370/254 |
| 2006/0215582 A1 | * | 9/2006 | Castagnoli et al. | 370/254 |
| 2007/0258508 A1 | * | 11/2007 | Werb et al. | 375/140 |
| 2008/0040509 A1 | * | 2/2008 | Werb et al. | 709/242 |
| 2008/0112387 A1 | * | 5/2008 | Gandham et al. | 370/345 |
| 2009/0147714 A1 | * | 6/2009 | Jain et al. | 370/311 |
| 2010/0177684 A1 | * | 7/2010 | Kore et al. | 370/328 |

OTHER PUBLICATIONS

Schurgers et al.; Topology Management for Sensor Networks: Exploiting Latency and Density; MOBIHOC'02, Jun. 9-11, 2002, pp. 135-145; EPFL, Lausanne, Switzerland; XP-001171557.

* cited by examiner

*Primary Examiner* — Kwang B Yao
*Assistant Examiner* — Jung-Jen Liu
(74) *Attorney, Agent, or Firm* — Husch Blackwell LLP

(57) ABSTRACT

A monitoring system includes a multi-hop time division multiple access communication system to link a control unit wirelessly and redundantly with a plurality of modules. Communications to modules occur during predetermined time slots in a first portion of a selected frame. Communications from the modules occur during corresponding time slots during a second portion of the frame.

15 Claims, 17 Drawing Sheets

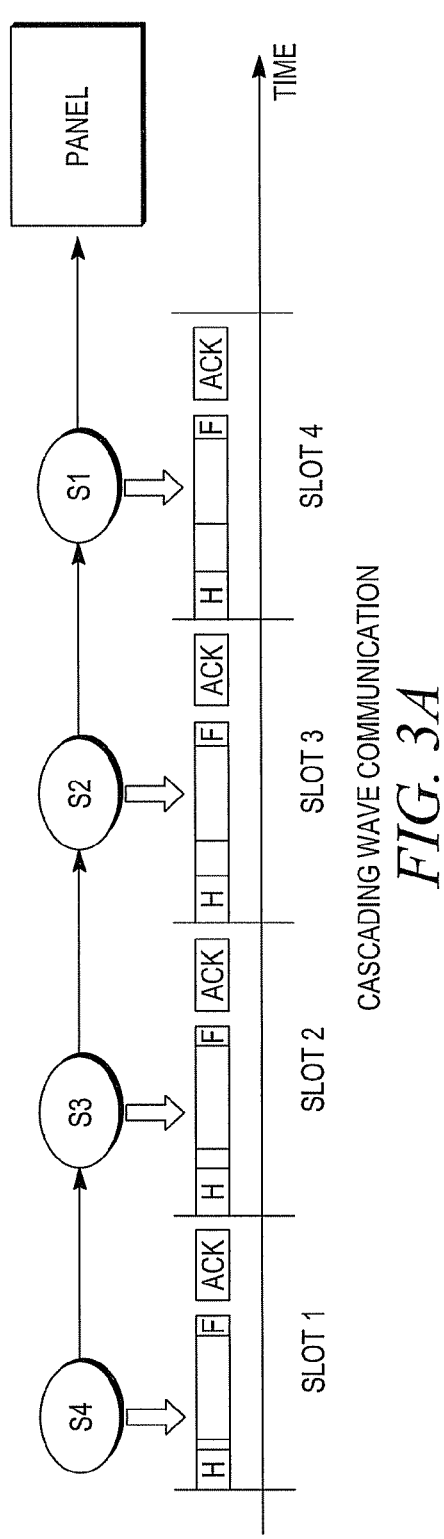

SLOT ALLOCATION AND RESULTING COMMUNICATION
IN NETWORK OF FIGURE 7A

EXAMPLE FIRE NETWORK

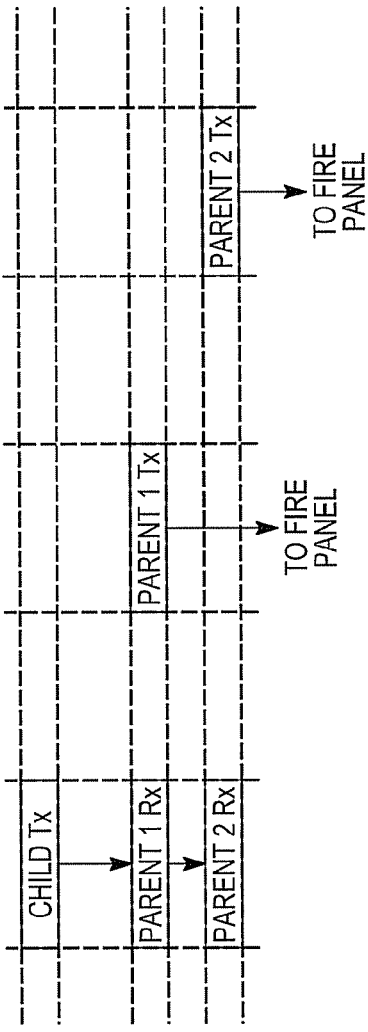
FIG. 8A
FIG. 8B
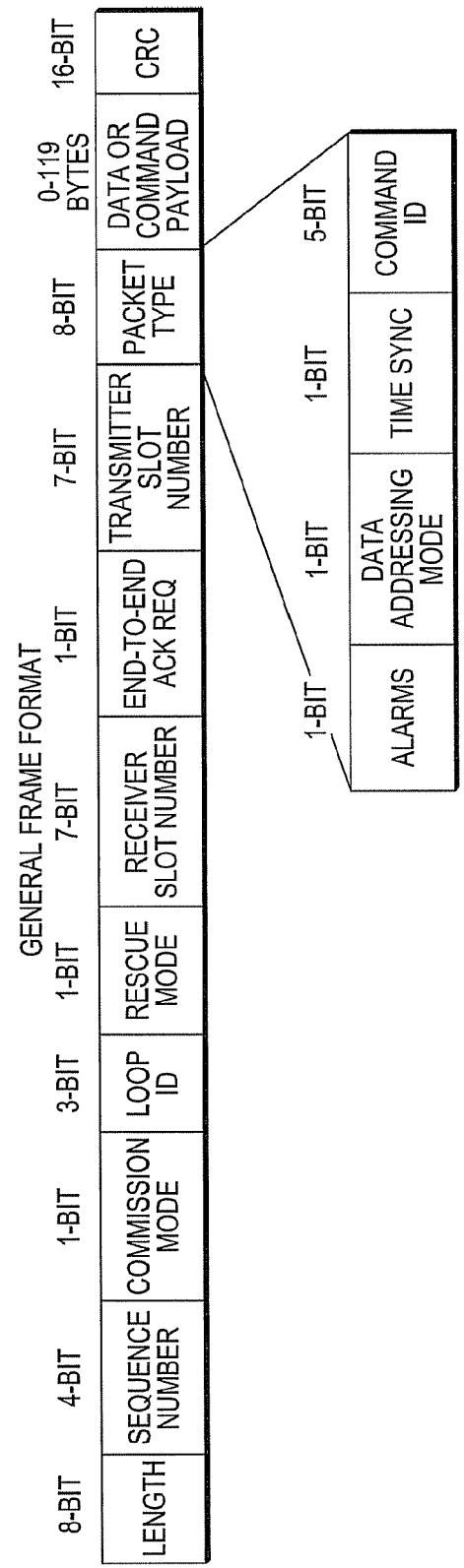
FIG. 9

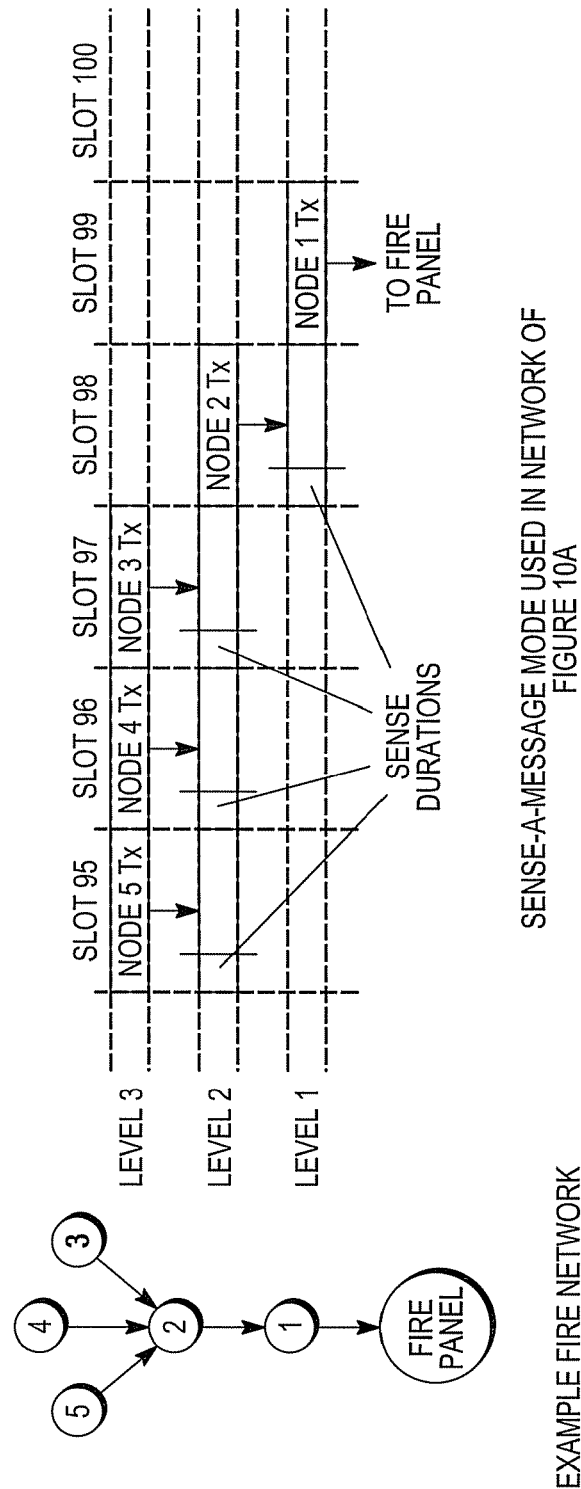

RESPONSE PHASE TRANSMISSION AS PER DESIGN
OPTION 1 IN NETWORK OF FIGURE 11A

EXAMPLE FIRE NETWORK

RESPONSE PHASE TRANSMISSION AS PER DESIGN OPTION 2 IN NETWORK OF FIGURE 12A

EXAMPLE FIRE NETWORK

WIRELESS MONITORING AND ALARM SYSTEM

FIELD

The invention pertains to environmental monitoring and alarm systems. More particularly, the invention pertains to such systems where some, or all of the various modules communicate wirelessly with a system control unit, such as a fire alarm panel.

BACKGROUND

Various types of monitoring and alarm systems are known. In many of these systems, modules such as fire, smoke or gas detectors are coupled via a wired medium, cables, for example, to a control unit or fire alarm panel. Such systems always reflect installation, operational and maintenance costs associated with the wired medium.

Examples of monitoring and fire detection systems are found in U.S. Pat. No. 5,483,222 to Tice entitled "Multiple Sensor Apparatus and Method" and U.S. Pat. No. 6,163,263 to Tice et al. entitled "Circuitry for Electrical Device in Multi-Device Communications System", which are assigned to the assignee hereof. Both U.S. Pat. No. 5,483,222 and U.S. Pat. No. 6,163,263 are hereby incorporated by reference.

There is an ongoing need to reduce the costs of installing and maintaining such systems. There is also an ongoing need to be able to conveniently and cost effectively modify the configuration of such systems, due to remodeling for example, or expansion of a monitored region.

It would also be desirable to be able to upgrade or expand existing wired systems while at the same time introducing a level of communications redundancy to take into account the characteristics of building spaces.

BRIEF DESCRIPTION OF THE DRAWINGS

FIG. 3A is a diagram that illustrates cascading communication;

FIG. 3B illustrates an exemplary data packet;

FIG. 3C illustrates a different exemplary data packet;

FIG. 8A is another exemplary fire detecting network;

FIG. 8B illustrates communications processing in accordance with the invention;

FIG. 9 illustrates a general packet format in accordance with the invention;

FIG. 10A illustrates another exemplary fire detecting network;

FIG. 10B illustrates communications processing in accordance with the invention;

DETAILED DESCRIPTION

Figure 1A:
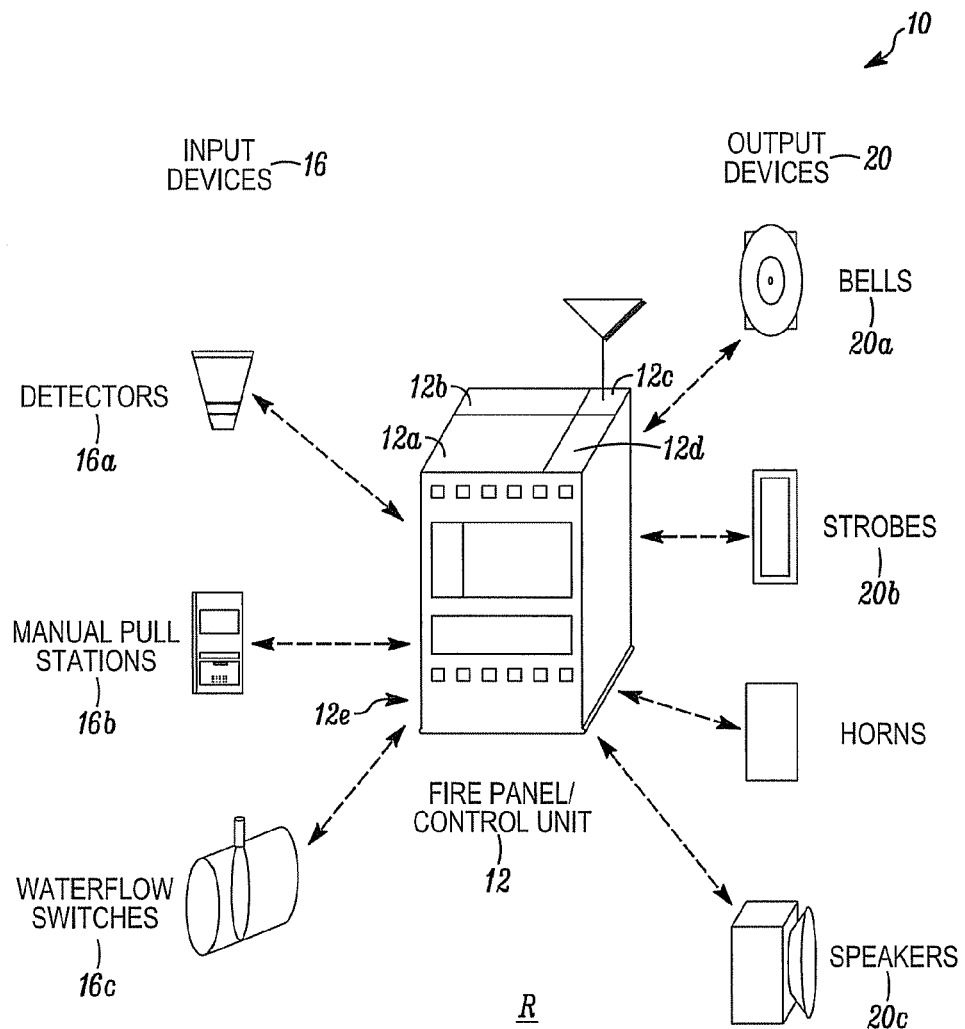
FIG. 1A is a block diagram of a system which embodies the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

A wireless environmental monitoring and, or alarm system which embodies the invention incorporates a multi-hop, time division multiple access (TDMA) communications protocol. Each module or device (a node), can have a parent-child relationship with two neighboring nodes which are in wireless range of the child node. Associating two parent nodes with each child node provides redundancy in communications.

FIG. 3A shows an example network of 4 sensors and a fire panel. The cascading wave communication protocol works on principle of data aggregation. As shown in FIG. 3A, the packet transmitted by sensor S4 has only S4's data. When packet is received by S3, it appends its data to S4's data and transmits it to S2. When packet reaches the fire panel, it carries data of all 4 nodes.

An exemplary wireless fire system can include, for example, 100 devices. The respective packet size can then be appropriate to aggregate data of all 100 devices. Each time slot is long enough to accommodate a maximum size packet and its acknowledgement. Those of skill will understand that neither the exemplary number of devices, nor packet size, or length of time slots is limitation of the invention.

To enable efficient data aggregation without increasing message latency, the child nodes are allocated Tx slots before the parent nodes. In the figure, S3 is a router or parent of S4, S2 is a parent of S3 and so on. The slots allocated to S4, S3, S2 and S1 are slot 1, slot 2, slot 3 and slot 4, respectively. Thus, child node's data is always available at the parent node during parent's Tx slot and parent can aggregate its own data with that received from its child node and transmit the data together in single packet.

A node can have multiple child nodes. The Tx slots of all child nodes occur before the parent. A parent's packet contains the data or alarms received from all its child nodes aggregated with its own data.

Due to aggregation, the transmission of 4 nodes' data to the fire panel needs only 4 slots. In case of 100 node network, it takes 100 slots for all nodes' data to reach the panel. Using the same protocol, the fire panel can also send data to all 100 nodes in the network which reaches all devices in 100 slots. For communication from fire panel to the devices the slot allocation of the nodes is reversed.

The protocol supports data aggregation in two ways— aggregation without implicit addressing and data aggregation with explicit addressing. In the aggregation mode with implicit addressing, the data/alarms from each device are mapped into a packet in sequence of its slot as shown in FIG. 3B. For example, the data/alarm of the device owning slot 1 will place its data in $1^{st}$ block in the pay load; the node owning slot 2 will place its data in $2^{nd}$ block following the $1^{st}$ node's data, and so on. Due to sequential arrangement of equal sized data, it's not needed to include the addresses of the nodes. The fire panel radio unit maintains a list of all nodes in the network and their slots. The radio unit de-aggregates the data from the received packet and delivers to the panel.

In one embodiment, the protocol supports 1-bit alarm transmission or 8-bit data/alarm transmission from all 100 devices as a cascading wave of aggregated data in implicit addressing mode. The Short-alarm packet carries 100 bits (1-bit alarm/device) payload while Long-data packet carries 100 bytes (1 byte of data/device) and 100 bits (1-bit alarm/ device) as payload. The packet lengths of Short-alarm and Long-data packets are always fixed. The slot is designed to accommodate a Long-data packet with payload of 100 bytes. The packet format is exemplary and is not a limitation of invention.

A mode of data aggregation with explicit addressing is supported in the protocol to provide power efficiency where needed to transmit a relatively long packet that carries a relatively small amount of data. In this aggregation mode, the slot number of the device is explicitly mentioned before the corresponding data element.

Explicit addressing is the default mode and is used when length of the resulting packet is less than length of Long-data packet as illustrated in FIG. 3C. The protocol supports 8-bit data and 16-bit data aggregation using explicit addressing. The packet resulting in this case can be very short. For example, when only one device is generating an 8-bit data, the payload will be just 2 bytes—8-bit slot number of the device and 8-bits of data.

When length of a packet with explicit addressing is estimated to be more than that of Long-data packet, the nodes automatically use the implicit addressing based aggregation. For example, in system shown in FIG. 3D, the node A may receive an aggregated data packet with explicit addressing with 8-bit data of 50 nodes from its child node. Node A can't add anymore data in the packet because packet length will then exceed maximum packet length. Therefore, Node A will first convert the received packet using implicit addressing based aggregation to make room for more data in the packet. This conversion is done by mapping the data from explicit addressing based aggregated packet into data blocks corresponding to slot numbers of an implicit addressing based packet. In this example, after the conversion, the received data of 50 nodes will fit in 50 blocks and there will be room for 50 more data blocks.

The implicit addressing based aggregation method need not support 16-bit data aggregation. A 16-bit data can be fragmented into two 8-bit data elements. The first element is aggregated in the converted packet. The remaining 8-bit element can be transmitted in a separate packet in the next Tx slot.

The time periods are divided into frames, or, phases of a predetermined duration, for example, two seconds. A frame or phase is further divided into a Request sub-phase, a Request Silent sub-phase, a Response sub-phase and a Response Silent sub-phase.

Figure 2:
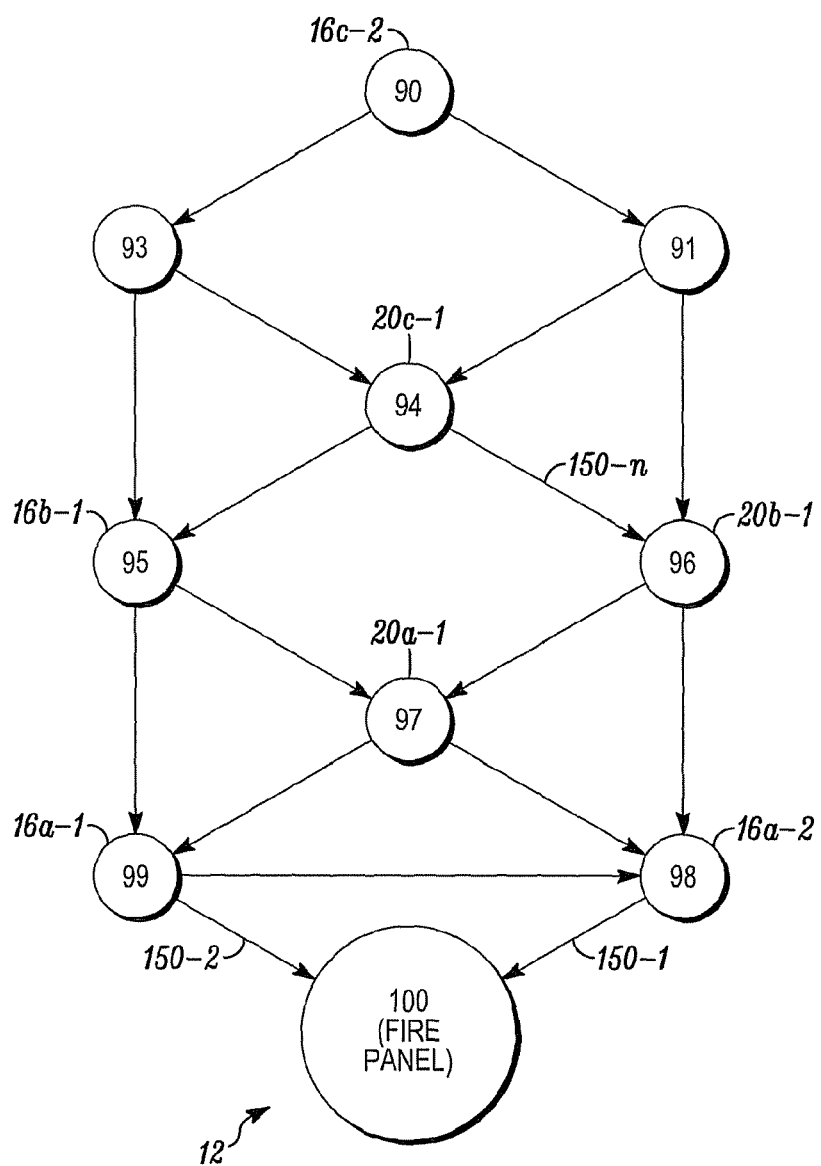
FIG. 2 is a view of the system of FIG. 1 illustrating exemplary communication links.
Figure 3:
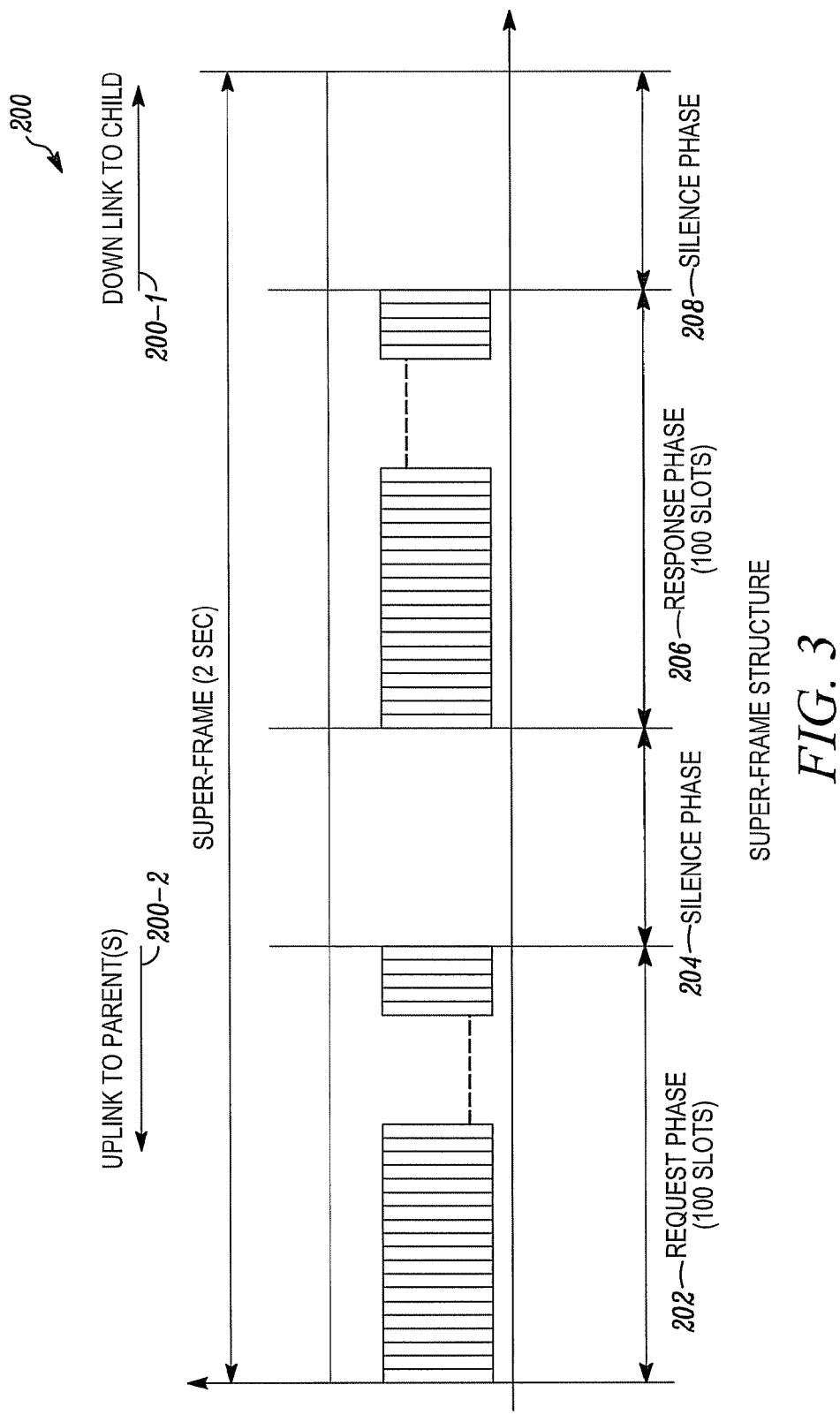
FIG. 3 is a diagram that illustrates an exemplary time division multiplexed communication frame.

FIG. 3 illustrates an exemplary overall frame 200. In the disclosed embodiment the total frame time corresponds to an exemplary two second interval. During this time interval, the data can traverse from the furthest level device, such as 16c-2 of FIG. 2 to the Panel 12 and back from the Panel 12 to the furthest level device 16c-2. Thus, exemplary round trip end-to end latency from devices to Panel and back form Panel to device will be on the order of 2 seconds. As data traverse at each level, the data is aggregated and the aggregated data is moved to next level.

Frame 200 includes:
 a Request sub-phase 202;
 a Request silent sub-phase 204;
 a Response sub-phase 206; and
 a Response silent sub-phase 208.

During the Request sub-phase 202, messages traverse from devices such as 16a-1 to the panel 12. Each device is assigned a time slot to send, for example an alarm/data/status message. Each module or device can report its status. Detectors or input devices can report alarm, data and other event messages.

The Request phase can be divided into a predetermined number, for example 100, of slots to accommodate each device's Request Tx Slot in the order of 1 to 100. In this phase, each Parent node will receive data from its child nodes in the respective child nodes' Slots and then aggregate the child nodes' data with its own data and transmit to its Parent node in its Request Tx Slot. This can be understood from the example network shown in FIG. 3. In this example, devices having Slots 93 and 91 can simultaneously receive data from a Child node having Slot 90. Each of the devices having slots 93, 91 can then aggregate the child's with its own data and send that composite to its respective parents. The Parent device having Slot 94 receives data from 93 and 91 and sends to its Parents 95 and 96 and so on till it reaches the Fire Panel.

During the Response sub-phase 206 messages from the panel 12 arrive at the devices such as 16b-1. Slot allocations in the Response sub-phase are mirror images of those in the Request sub-phase. In Request phase panel 12 has last slot where as in Response phase the panel has first slot. The fire panel node transmits a Clock Beacon during its Request Tx slot whereas Response Tx slot is used for transmitting panel's data to the devices in the network.

The Response phase can be divided into 100 exemplary Response phase Slots to accommodate each device's Response Tx Slot. The slot allocation in the Response phase is the reverse that of the Request phase. The panel gets the $1^{st}$ slot, the nodes close to the panel get lower numbered slots and nodes away from panel get higher numbered slots. Due to this slot allocation, cascading data flow from the panel towards devices is established. The slot number in Response phase is calculated by subtracting the Request phase slot number, which is allocated by GSM, from 101. In this sub-Phase, the each node will receive aggregated data from its Parent node in the Parent node's Response Tx Slot, process its own data then broadcast the data to its Child nodes in its own Response Tx Slot. For example the device having Slot 99 will receive aggregated data from it's Parent node (i.e. Fire Panel) having Slot 100 in the Parent's Response Tx Slot, process its own data and then broadcast the data to its Child nodes in its own Response Tx Slot. The Child nodes 98 and 97 receive this data, process their own data and broadcast to their Child nodes and so on till the aggregated packet reaches all the devices of the network.

All slots of the Request and Response phase preferably, but not necessarily, are of equal duration.

In addition to the on-the-air time of the Long-data packet and ACK, the Request Tx slot duration has a dead time for tolerating the worst case clock drifts of the transmitter and receivers. To avoid missing a packet due to this drift, the receiver node(s) can remain on before the earliest time in the slot when transmitter can begin transmission considering the worst case drift. The transmitter also needs to wait before it begins the transmission so that a worst drifted receiver node can receive its packet. The time needed in the time slot for drift tolerance depends on worst case possible drift in the transmitter and receiver.

The slot duration should also provide time for the transmitter and receiver nodes to come out of sleep and turn on their transceivers in appropriate modes (Tx or Rx), for receiver nodes to process the received packet and for both nodes to switch in Tx or Rx mode for transmitting or receiving the ACK.

As discussed relative to FIG. 2, the Slots can be numbered from 1 to 100 with $100^{th}$ Slot number being allotted to Fire Panel node by default, $99^{th}$ to next deployed device, $98^{th}$ Slot Number to next one and so on. Along with getting a Slot Number, a new device (except Panel) joining the network can also be assigned two Parent devices for redundant connectivity with which it can communicate directly and are in it's in the radio range. More than two parents can be assigned to each node if more redundancy is desired. The number of parents and number of slots are exemplary only and not a limitation of the invention.

The Fire Panel can be assigned the highest slot number, for example slot number 100, the next device deployed will have Slot Number 99 and Parent device as 100 (only one Parent available). The third device will have Slot Number 98 and Parents would 99 and 100. Fourth device will have Slot Number 97 and Parents could be any 2 of these: 98, 99 or 100 based on Signal strength and so on.

As the whole network is Time Slotted network, each of the devices has to be in Time Sync with its Parent and Child nodes. The connected devices will periodically Time Sync with respective parent(s) using Health messages.

Health messages can be used for time synchronization as well as node failure detection. Each node or device transmits a Health message to its parents. The parents acknowledge the Health message. The Health messages terminate at the parent nodes, they are not forwarded to the fire panel 12.

The Health messages carry information required for time sync. The Time Sync information can include frame number, phase, slot number, clock ticks and frequency hop phase, discussed subsequently. All the connected devices use the Health message Ack received from respective parents to carry out the Clock correction and Time Sync with that parent. For example, the child node can transmit its time and frequency hop phase information in the Health message. The parent nodes can then transmit their time and frequency hope phase information in the Health ACK packet. The child node can find the difference between its clock and the parent's clock and can correct its clock to synchronize with that of the parent. An alternate design option can be implemented where a node can time synchronize using the Health message transmitted by the parent node to its parent node.

Distributed health or operational monitoring can be implemented. Each parent node can monitor status or health of its Child nodes. Two or a predefined number of missed Health status messages can be considered child node failure.

Two or a predefined number of missed Health status Acks can considered as parent node failure. In this event, Re-discovery of parent can be initiated. As each node of the network has 2 parents, in event of failure of one parent or link, the node continues to relay the data through the available parent node while re-discovering another parent.

Health status can be communicated to the fire panel 12, for example only if a child node failure is detected or a child node reports health problem.

An address of failed node can be communicated to the control unit or panel 12. Multiple failures can be indicated to fire panel in a single message using message aggregation. Where fire alarms and a node failure occur simultaneously, alarm messages may be given priority and the node failure message can be sent in the following frame's Request phase.

Health or status messages can be transmitted periodically, for example once every 16 seconds, by each node. Periodicity of Health messages can be decided by time sync requirements. If a Health message is not acknowledged by parent node, it can be re-transmitted at the most twice in Request Tx slots during the following two Frames. This ensures that node will get synchronized within 20 seconds, The periodicity of Health message is also designed in order to detect node failures within desired time.

In another aspect of the invention, a device or module can exhibit two different operating modes. On startup, a device (Input/Output, such as detectors or alarm indicating output modules) except the Panel node goes to discovery mode. In this mode, it exhibits passive listening and traps all received Health messages from the neighboring nodes. It uses these messages to establish time and frequency synchronization with the network and to identify the potential parents. It can then request that the panel or control unit assign a dedicated slot number and two parent nodes out of the potential parents it has identified. Once these assignments have been made, the module or unit is connected to the network and goes to a normal operating mode.

The Fire Panel executes a global slot manager (GSM). The GSM is responsible to assign Slot and Parents to all devices on request by these new joining devices on Startup (Discovery mode). GSM ensures that any device can have a predetermined maximum number of Child nodes, for example, six. This number is exemplary only, and can be changed depending on density of network, range and battery life expectation.

In the discovery phase, the respective device would be in a passive listening mode and receive Clock Beacons from Panel 12 (in case Panel is in its radio range) and Health messages from the neighboring nodes in its radio range. That device uses these messages to Time Sync with the network and stores the neighbor's Slots and Signal Strength information.

After a selected time interval, for example on the order of 32 seconds, it identifies the best four (or more, if available) potential best parents based on Signal strength. Then it forms a Slot request packet and routes the Slot request via its best potential parent to Fire Panel node.

Figure 6:
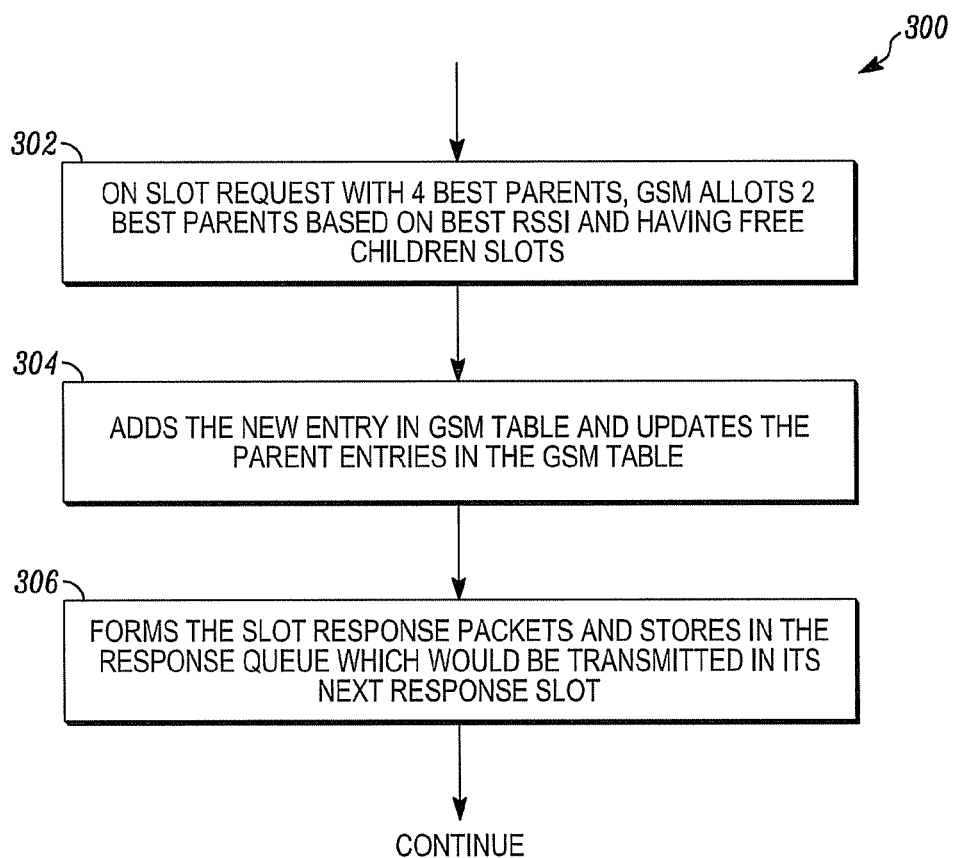
FIG. 6 is a flow diagram of processing by the control unit in response to a request that a module or detector be added to the system of FIG. 1A.
Figures 7A, 7B:
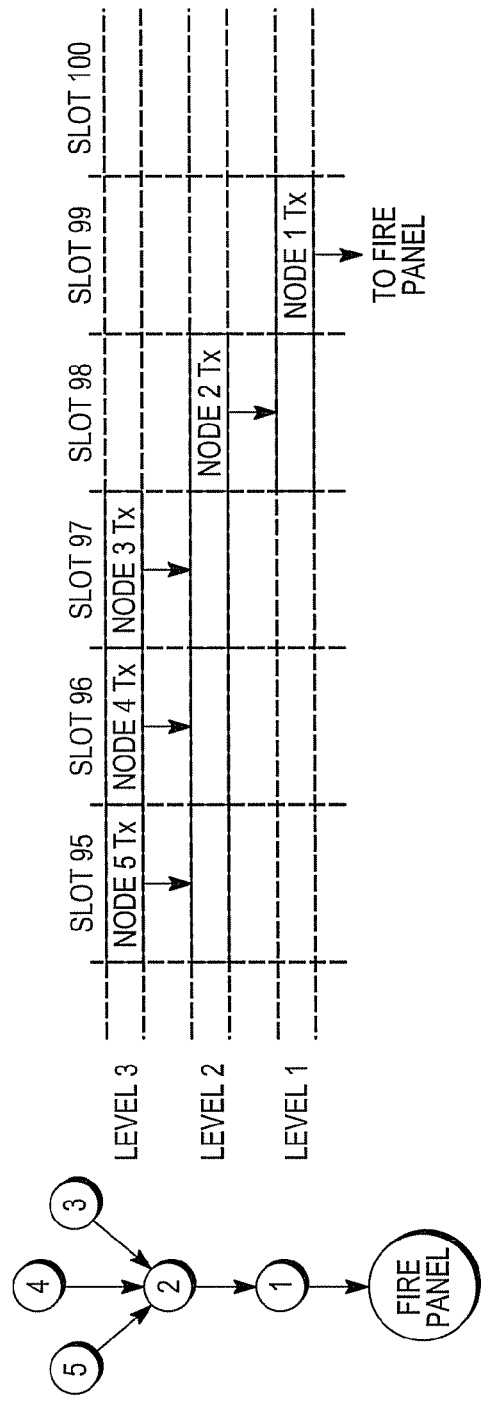
FIG. 7A is an exemplary fire detecting network.
FIG. 7B illustrates processing in accordance with the invention.

The GSM in Fire Panel node allots a Slot to the new device and also allots two Parents to it. The new Slot allotted will be always less (earlier) than its two Parent Slots. The GSM Table is then updated and Slot Response Packet is constructed. FIG. 6 is an exemplary flow diagram of a process 300 carried out by the GSM software on receipt of a slot request by newly added or joining modules or devices. The two best parents are allocated, as at 302. The new entry is added to the GSM table, as at 304. Slot response packets are formed and stored for later transmission as at 306. Other aspects of system operation follow.

The Slot Response Packet is transmitted by the Panel during Response phase to the selected Parent nodes and the new Device via the established nodes. The Parent nodes and the new Device update this entry in its Local Slot Manager (LSM) Table. The new Device exits the Discovery phase after getting slot and parent allocated and enters the Normal operation mode.

There will be scenarios where it's not possible to meet the condition that parent nodes' slot should be higher than child's slots. The GSM can rearrange the slots of the established nodes if it can't find correct parents for a node. The protocol defines the messages required for slot reallocation and procedure to synchronously jump to new slot allocations.

The device will be in a normal operating mode when it is connected to network and has an assigned slot number and assigned parents. In a Request phase of a communications frame, as discussed subsequently, that unit wakes up, becomes active, during its Child nodes' Request Tx slots to receive any data from them and then to transmit the data in its own Request Tx slot. The transmission from the node includes the data received from its Child nodes and also its own data if available. Similarly, during a Response phase of the frame, it wakes up on its parent node's Response Tx slot to receive any data and then broadcasts the data in its Response Tx slot to its Child nodes. The unit goes into a sleep mode during all other periods. On losing connection with either or both of its parents, the node goes into the discovery mode.

A parent node wakes up at it each Child nodes Request Tx slots, listens for a small portion of slot and senses if it has any packets to receive. If yes, receives the packet completely, sends Acknowledgment, processes the packet and stores it in the intended queue. Else it goes to Sleep after the sense duration. Each node wakes up at its Request Tx slot and transmits if any packets available. If any packets are transmitted, it waits for Acknowledgment. On receiving the Acknowledgement, they are removed from the Retry queue. If no Ack received, the same packet will be transmitted again in its own Request Slot in next frame 200A (FIG. 3). Once a parent node sends an ACK to child node, the responsibility of delivering the packet shifts to the parent node. The parent node puts its best effort to successful relay of this packet using redundancy and retransmissions.

Every message in a Request phase is acknowledged by a parent node. In case of redundant connectivity having 2 parents, each parent node sends ACK for every alternate message. The child node indicates the parent which needs to acknowledge the packet using one of the header fields. After receiving an ACK, the corresponding message is removed form the queue. The same logic applies to Health messages. Each parent node sends ACK for an alternate Health message. If the ACK is not received, then the message is retried till the ACK is received or 3 consecutive attempts fail. A predefined number of ACK failures result in the child node concluding that corresponding parent node is dead.

When a node doesn't have any message to transmit in the Tx slot, it uses the slot to help the new nodes to join the network. The node turns its receiver on and waits for a message from a discovering node. The discovering node can use a known CSMA protocol or other techniques in this slot to avoid collisions with possible transmission from the established node & other discovering nodes. If the established node receives a message from a discovering node, it relays it to the panel through its parents.

Operation during the Response phase, in one embodiment, is described below:

A node wakes up, becomes active, during its parent node's Response Tx slots. It listens for a small portion of a slot and senses if there is transmission that it should receive. If yes, it receives the packet completely, processes the packet and stores it in the intended queue. Otherwise, it becomes inactive, and goes to Sleep.

A node wakes up at is own Response slot and broadcasts the packet to its Child nodes' if any packet available for transmission.

A node does not become active during the Response silent sub-phase.

The redundant parent assignment and resulting communication is explained in FIG. 8B with reference to a network as in FIG. 8A. As illustrated in FIGS. 8A,B, the child node's data is received by parents P1 and P2 in the child's Tx slot. Both the parent nodes transmit the data to the panel in their Tx slots. The panel receives C's data twice and discards the redundant one.

As noted above, the protocol can implement dual redundancy. Each node is provided with two parents. The transmission of a child node is simultaneously received by both the parent nodes. Both parent nodes aggregate and/or relay the child's data to their redundant parents. Due to redundancy at each hop, the fire panel radio unit may receive a nodes data multiple times. The fire panel radio unit discards redundant data units and delivers a data from each node to the panel.

The network supports cascading wave communication of one packet of length less than or equal to that of Long data packet during Request phase of every Frame 200. As discussed before, this packet can be used to carry aggregated sensor data/status and alarms to the panel or it can be used for sending separate messages from an input/output device to fire panel. The Request phase Tx slots are used for transmission of slot allocation request messages, which are not aggregated. The device can send any other custom application level message of length less than or equal to Long data packet to the panel. These packets are relayed by network devices to the panel using the cascading wave protocol as discussed before.

Figures 11A, 11B:
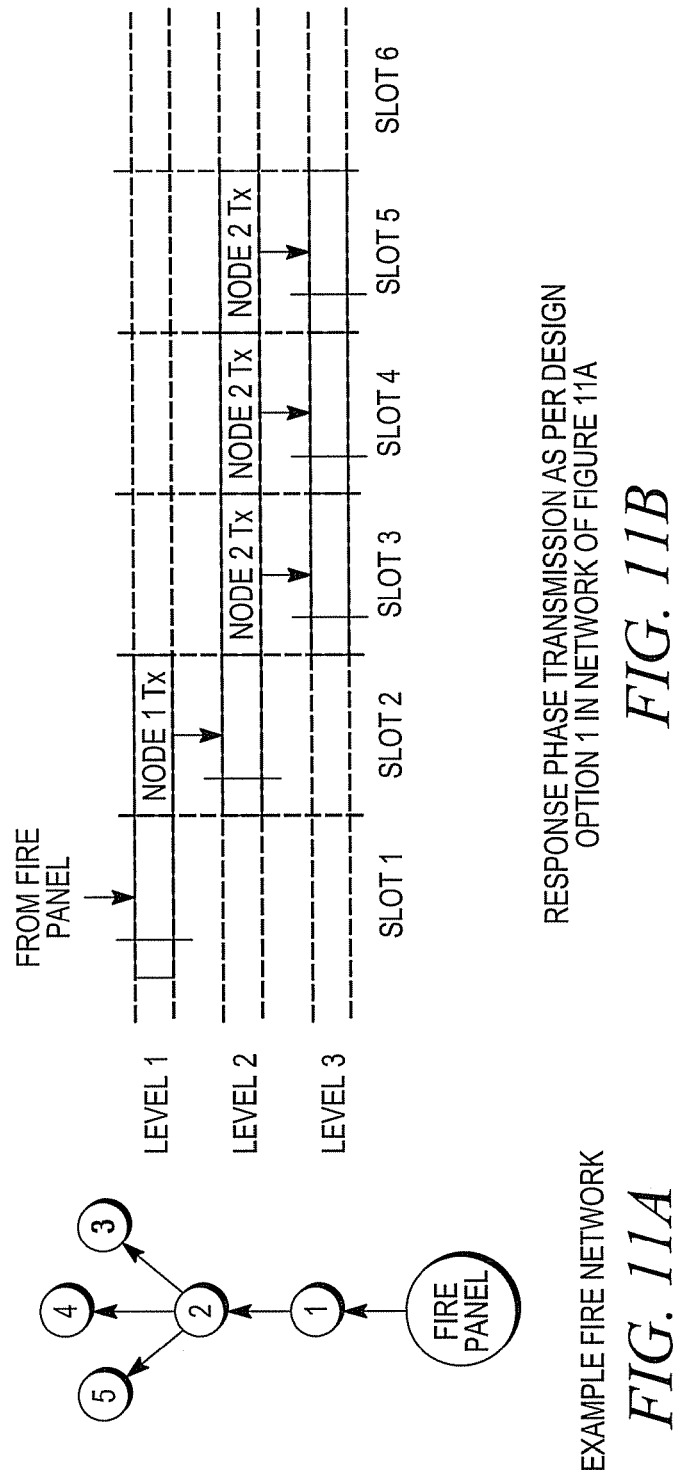
FIG. 11A illustrates another exemplary fire detecting network.
FIG. 11B illustrates communications processing in accordance with the invention.

While communicating in the Response phase, multiple unicast messages can be sent from the parent to reach child node. In this configuration, Every node will be allocated multiple Tx and Rx slots the Response phase. As illustrated in FIGS. 11A, B there will be a receive slot which will be used to receive data from each parent and separate Tx slots will be used to send the unicast data to the corresponding child nodes.

Figures 12A, 12B:
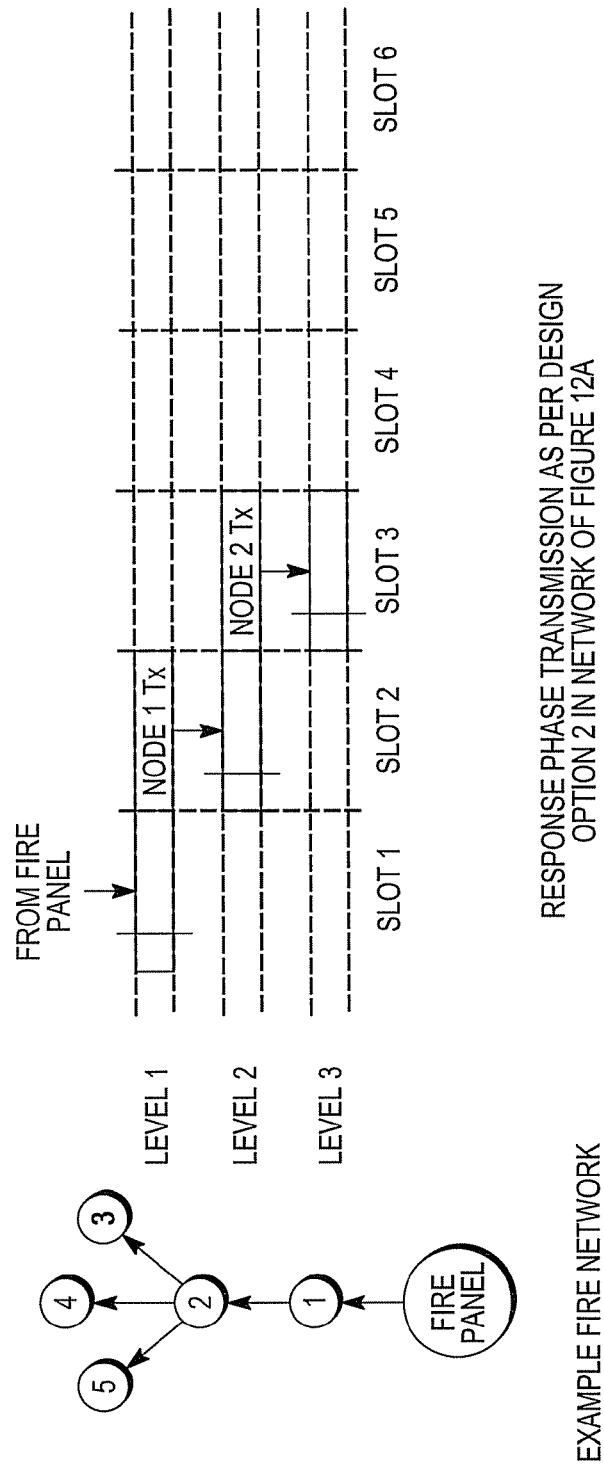
FIG. 12A illustrates another exemplary fire detecting network.
FIG. 12B illustrates communications processing in accordance with the invention.

In alternate processing, illustrated in FIGS. 12A, B, each parent transmits the panel's packet to all its child nodes as a multicast packet. The Response Tx slot of the parent node is used to transmit the data to child nodes. All child nodes will listen to the parent in this slot. Nodes selectively listen to the other parent having a later slot if the packet reception from the parent node fails.

The processing of FIG. 12B is more power efficient than processing of FIG. 11B. Either of these options can be implemented based on communication and battery life requirements.

The panel sends a packet with aggregated messages containing commands for all the nodes in the network to the first level nodes. The packet generated by the panel node can be aggregated using implicit or explicit addressing modes depending on number of information bytes to be packaged. The aggregated packet is forwarded by all nodes to their child nodes. Each node decodes the packet to see if there is any data for itself.

Each parent node multicasts the packet to all child nodes. Therefore power consumption in Response phase is independent of number of child nodes and is optimized for long battery life.

Figure 13B:
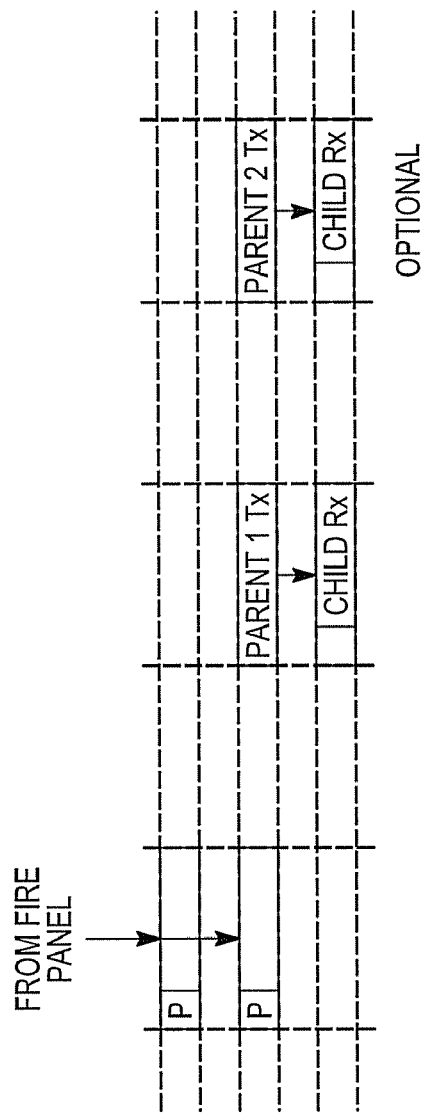
FIG. 13B illustrates communications processing in accordance with the invention.
Figure 13A:
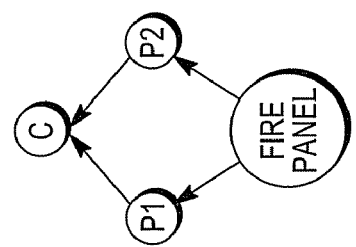
FIG. 13A illustrates another exemplary fire detecting network.

FIG. 13A and B explain the redundant communication during Response phase. As illustrated in FIGS. 13A, B, all first level nodes receive the packet from panel during slot 1. The packet is forwarded by these nodes to their child nodes in their respective Response Tx slots. All these child nodes of these nodes, i.e. second level nodes, forward the packet to the next level nodes in their Response Tx slots. The panel's packet reaches the most distant nodes of the network during later slots of Response phase. Thus, panel's commands reach all nodes during the Response phase irrespective of the network topology and number of hops between the panel and nodes.

Each Response Tx slot is used only for transmission of the packet. There is no acknowledgement or re-transmission supported in the Response phase. As redundancy is supported, the child nodes can listen to the $2^{nd}$ parent if reception from the $1^{st}$ parent is not successful.

To improve communication stability in absence of link level ACKs during Response phase, end-to-end ACKs can be implemented. Most of the commands received from the panel are acknowledged by respective devices by sending an ACK to panel in the following Request phase. Similarly the Panel node may also send ACKs to data/alarm generating devices in the following Response phase to confirm reception of their messages.

The Panel's packet may not be de-aggregated while forwarding during Response phase. The sequence number of the command packet is included in the ACK by the nodes to refer to correct packet. The radio unit of the panel keeps track of the ACKs and re-transmits the commands if needed.

Each node in the network having associated child nodes needs to relay panel's packet in the Response phase. But, during normal situations the panel generates small amounts of traffic. So transmissions during Response phase have a small impact on the battery life of nodes.

To reduce the power consumption, the packet size can be kept to a minimum. The nodes can also use a sense-a-message mode to reduce the power consumption during unused slots.

Further optimization in battery life is possible by selectively forwarding the packets. There are several ways to reduce the number of transmissions from each node during Response phase. One of them is to keep list of indirect child nodes (child nodes of child nodes) at each node and forward panel's messages only if either indirect child node is a destination.

The network supports cascading wave communication of one packet of length less than or equal to that of Long data packet during Response phase of every Frame 200. As discussed before, this packet can be used to carry aggregated commands from panel to input/output devices or it can be used for sending separate messages from panel to input/output devices. The slot allocation response is an example of separate message transmitted from panel. Similarly any application level message can be sent from panel to an input/output device. This can useful for downloading configuration data, changing operational modes, downloading firmware, etc. Using separate messages during Request and Response phase conventional information polling mechanisms can also be implemented where panel can request for specific information from a device using a custom application level message during Response phase and the respective device responds with the information using another custom application level message during following Request phase.

Every node uses its Request Rx slots to receive a message from a child node. But, as discussed above, the nodes transmit their data, alarm, status very rarely. So for most of the times, only Health messages are transmitted by child nodes. To provide the child nodes a chance to transmit in any of their Tx slots, the parent nodes have to wake up in their every Rx slots. Duty cycle of a parent node therefore depends on number of child nodes it has. Nodes receive Fire panel's transmissions from their parents during Response phase Rx slots. The panel rarely generates any data in absence of an event.

To conserve power during the unused Request and Response phase receive slots, the parent nodes use a sense-a-message mode. In this mode parent nodes become active, wake up, in their Rx slots & put the transceiver in receive mode. Because of synchronization, if the child node has a data to transmit, it is expected to begin transmission immediately after start of the slot duration. If the parent node doesn't sense any RF signal during an initial, predetermined, duration of the slot, it concludes that child node doesn't have any data and becomes inactive, goes to sleep.

The above is illustrated in FIG. 10B for the exemplary network of FIG. 10A. Node 2 turns its receiver on and senses-a-message during early portion of the slots 95, 96 and 97. If it senses a message, it continues to receive. If no RF signal is received from the child nodes in the sense durations, it goes to sleep at the end of the sense duration.

The sense duration, needed to sense-a-message is very small as compared to slot duration. This technique results in a very power efficient operation & ensures longer battery life even in case of multiple child nodes.

Figure 14:
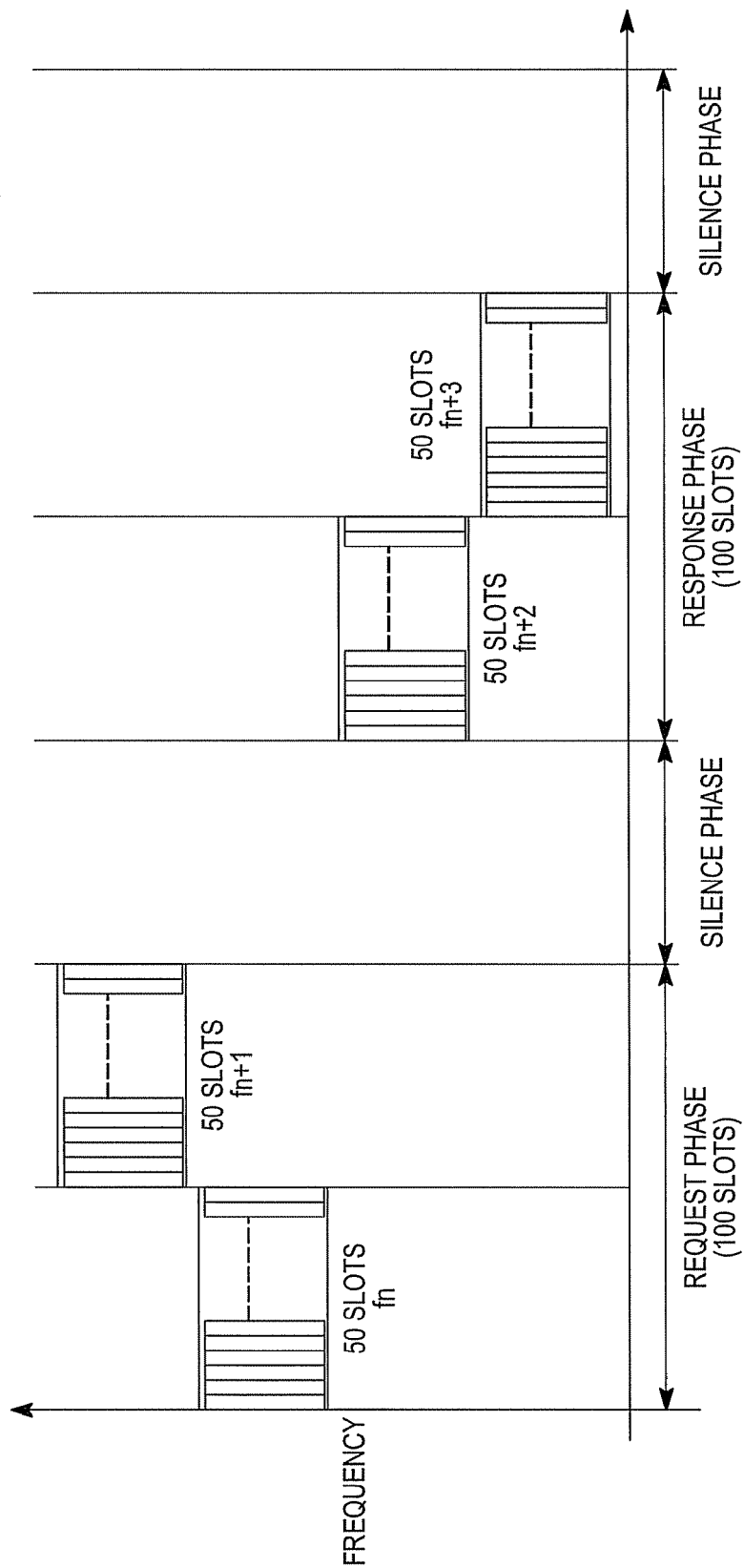
FIG. 14 illustrates an exemplary form of frequency hoping.

To avoid interference from other systems or equipment, a frequency varying, agile or, hopping process can be incorporated such that every transmission from a node happens at a different frequency. In accordance therewith, all the nodes of the wireless fire system 10 can hop to a new random channel after every 50 slots. This results in a single channel like operation for every 50 slots. The system hops through 4 channels during a super-frame as shown in FIG. 14.

A pseudo-random frequency hopping pattern can be based on a known random sequence generation algorithm, without limitation. All nodes in the system can be programmed to use the same algorithm so that they hop to the same frequency in a given phase. All nodes can switch to a new channel at the beginning of every phase and at the end of a predetermined slot, for example, slot 50 of each phase. Other frequency varying processes come within the spirit and scope of the invention.

The phase of FH sequence can be used to derive the next channel to hop to. The phase can be incremented, for example, every time after hopping to a new channel.

Each Request Tx slot can be used to send only one packet having length less than or equal to Long data packet. To handle situations where more than one Tx packets are available at a node, a priority based transmission is implemented. The Request phase packets are prioritized in the following order:

1) Alarm and data (including status of output devices) message

2) Trouble and status message

3) Slot allocation & other network maintenance messages

If a node has multiple messages to be relayed, it first checks if there is an opportunity to aggregate those. But the messages of different types can't be aggregated. In that case it transmits messages in reducing order of priority. For example, if a node receives an alarm message from one of its child nodes and also has an internal trouble message to be transmitted at same time, it transmits the alarm message in immediate Tx slot. The trouble message is transmitted after successful transmission of the alarm message in the following Tx slot.

Similarly, each Response Tx slot can also be used by the panel to send only one packet of length less than or equal to Long data packet. The messages in the Response phase prioritized in the following order:
1) Output change commands
2) Mode change commands
3) Configuration download commands
4) Slot allocation & other network maintenance responses If the device fails to transmit the output change command message due to link failure, it re-transmits the message in the following super-frame. If it receives another output change command message before retransmitting the old message, it ignores the old message and transmits the fresh one. The panel always includes output commands for all output devices irrespective of whether a device activation status needs to be changed.

Mode change packet transmissions/retransmissions are deferred until all output change commands are successfully transmitted.

Figure 15:
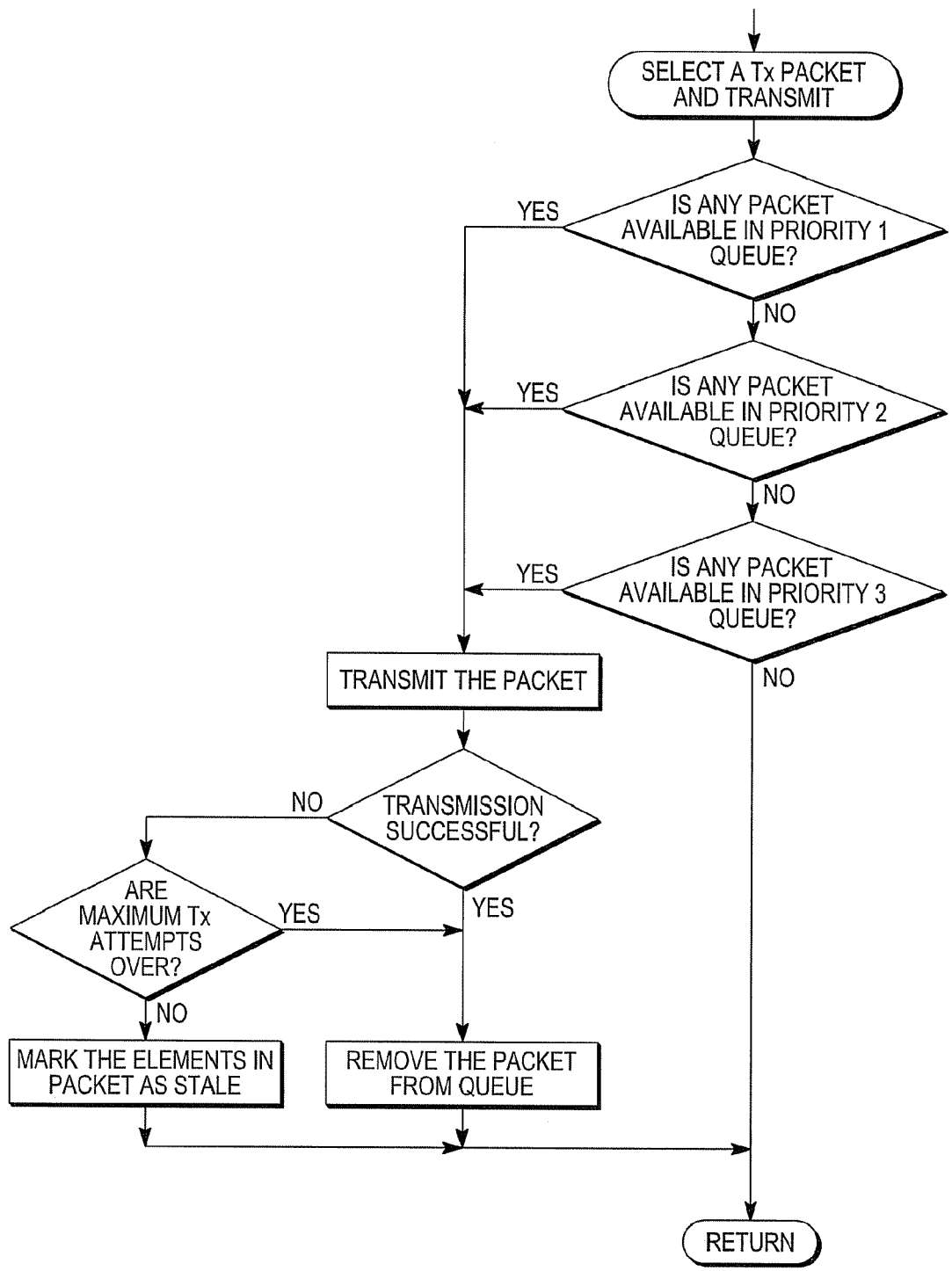
FIG. 15 is a flow diagram of a method implementing prioritized data transmission in accordance with the invention.

FIG. 15 is an exemplary flowchart of a method to implement the prioritized data transmission.

During pre-emergency or emergency situation, input devices sense alarming variation in the parameters monitored by them. The rate of change of the parameters may also be high. This results in frequent alarm and data transmission from the input devices. This leads to multiple commands transmission from panel to the output devices. All output devices send a status message to the panel in response to the activation/deactivation command received from the panel. The number of messages transmitted during the rush-hour can be very large. Wireless networks tend to become unreliable if when multiple messages are generated simultaneously. The cascading wave protocol meets the reliability and latency requirements because it gives provision to aggregate all these messages and enables their transmission at high priority.

FIG. 1A illustrates a system 10 which embodies the invention. System 10 includes a fire alarm control panel, or control unit 12, a plurality of input devices 16 and a plurality of output devices 20. System 10 could be installed in a region R to provide monitoring and alarm indicating functions as would be understood by those of skill in the art.

Control unit 12 could be implemented with one or more programmable processors 12a, interface circuitry 12b, a transceiver and associated antenna(s) 12c as well as control software 12d. Control software 12d could be stored on a computer readable medium and executed by processors 12a to implement the above noted communications protocol.

Each of the members of the plurality 16 which could include without limitation, fire, smoke or gas detectors 16a, pull switches 16b or water flow switches 16c. The members of the plurality 16 are each in bidirectional wireless communication, via a predefined time slot, directly or indirectly with control unit 12.

Each of the members of the plurality 20 could include without limitation, audible devices such as bells, horns, or the like 20a, visual output devices such as strobes 20b and verbal-type audio output devices such as speakers 20c. The members of the plurality 20 are each in bidirectional wireless communication, via a predefined time slot, directly or indirectly with control unit 12.

Figure 1B:
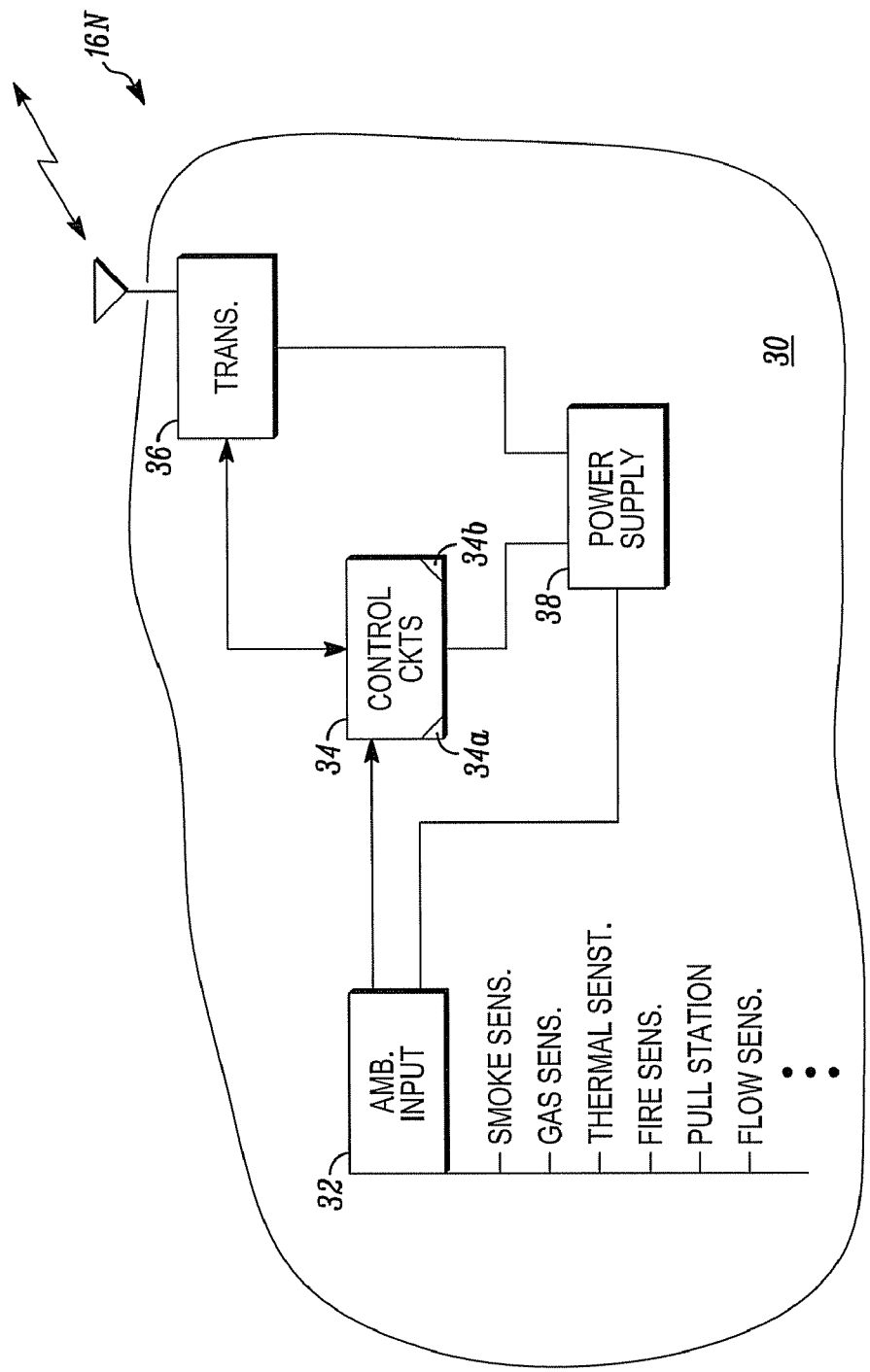
FIG. 1B is a block diagram of input devices usable with the system of FIG. 1.

FIG. 1B illustrates a representative block diagram of a wireless input device 16i. Device 16i has a housing 30. Housing 30 carries an ambient condition sensor 32 such as a smoke sensor, a gas sensor, a thermal sensor, a fire sensor, a pull station, a flow sensor or the like all without limitation. The device can also implement multiple ambient sensors. Ambient input device 32 couples condition indicating output signals to control circuits 34. Control circuits 34 can be implemented with one or more programmable processors 34a and associated control software 34b which could be recorded on a computer readable medium.

Control circuits 34 are coupled to an RF transceiver 36 and is in bidirectional communication with other modules and/or the control unit 12. A power supply 38, implementable with a battery, or from an external source, or both, energizes the device.

Figure 1C:
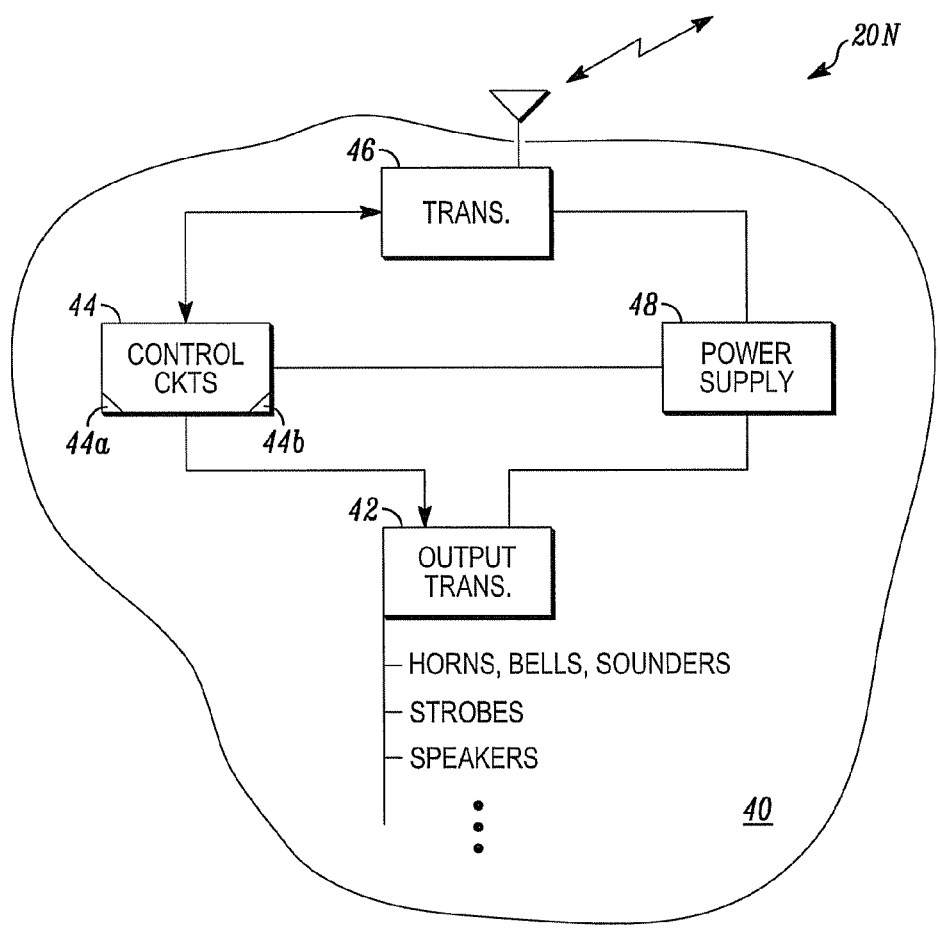
FIG. 1C is a block diagram of a output devices usable with the system of FIG. 1.

FIG. 1C illustrates a representative block diagram of an output device 20i. Device 20i has a housing 40 which carries an output transducer 42. Output transducer 42 could be implemented with a non-verbal audio device such as a horn, bell or sounder. Alternately transducer 42 could be implemented with a strobe, for a visual output, or a speaker to provide for verbal output. An output device can comprise of multiple audio-visual indication elements such strobes, speakers, bells, sounders, etc. A hybrid device can have one or more sensors and one or more audio-visual indication elements.

Device 20i can also include control circuits 44 which can energize the output transducer 42 as needed. Control circuits 44 can be implemented with one or more programmable processors 44a and associated control software 44b which could be stored on a computer readable medium.

Device 20i can also include an RF transceiver 46 coupled to control circuits 44. A power supply 48, which might be coupled to a battery, or, an external source of electrical energy, or both, to drive the transducer 42, can also be coupled to the other electronic components of device 20i.

FIG. 2 further illustrates characteristics of slot assignments, previously discussed above. Control unit or panel 12 is assigned the highest numbered slot, such as slot 100. Detector 16a-1 can be next installed and will be assigned slot 99. Another detector 16a-2, next installed can be assigned slot 98. Output device 201-1 can be assigned slot 97.

As illustrated in FIG. 2, detector 16a-1 can communicate directly with panel 12. Detector 16a-2 can communicate directly with panel 12 and indirectly via parent detector 16a-1. Output device 20a-1 is only in indirect communication with control unit 12, via detector 16a-1 or 16a-2. Output device 20c-1 is only in indirect communication with control unit 12 via detector 16b-1, and output device 20b-1.

Since time slots are assigned on installation, the function of a module has no impact on that assignment. It will be understood that the links illustrated in FIG. 2 such as 150-1, -2 . . . -n reflect bidirectional communications between indicated modules or the control unit 12, as discussed below relative to the communication frame of FIG. 3.

For example, with respect to FIG. 2, the data generated by node 90 traverses along multiple paths during Request phase as follows:
90→93→95→99→PANEL;
90→93→94→94→96→97→98→PANEL;
90→91→96→98→PANEL;
90→91→94→95→99→PANEL, etc.

The data generated by fire panel reaches the node 90 during Response phase along the following paths:
PANEL→99→95→93→90;
PANEL→98→96→91→90;
PANEL→98→97→96→94→93→90;
PANEL→99→95→94→91→90, etc.

The sensor value data of the furthest level device 90 has to reach the Panel 12. The data moves via modules 93, 95, 97 and 99. At each level, say 93 the data of 90 is aggregated with the data of 93 and then transmitted to 95. Again at 95, the data of

90 and 93 are aggregated with the data of 95 and transmitted to 97 and so on. Thus the Panel 12 receives all the aggregated data at the end of Request phase of the frame 200.

Figure 4:
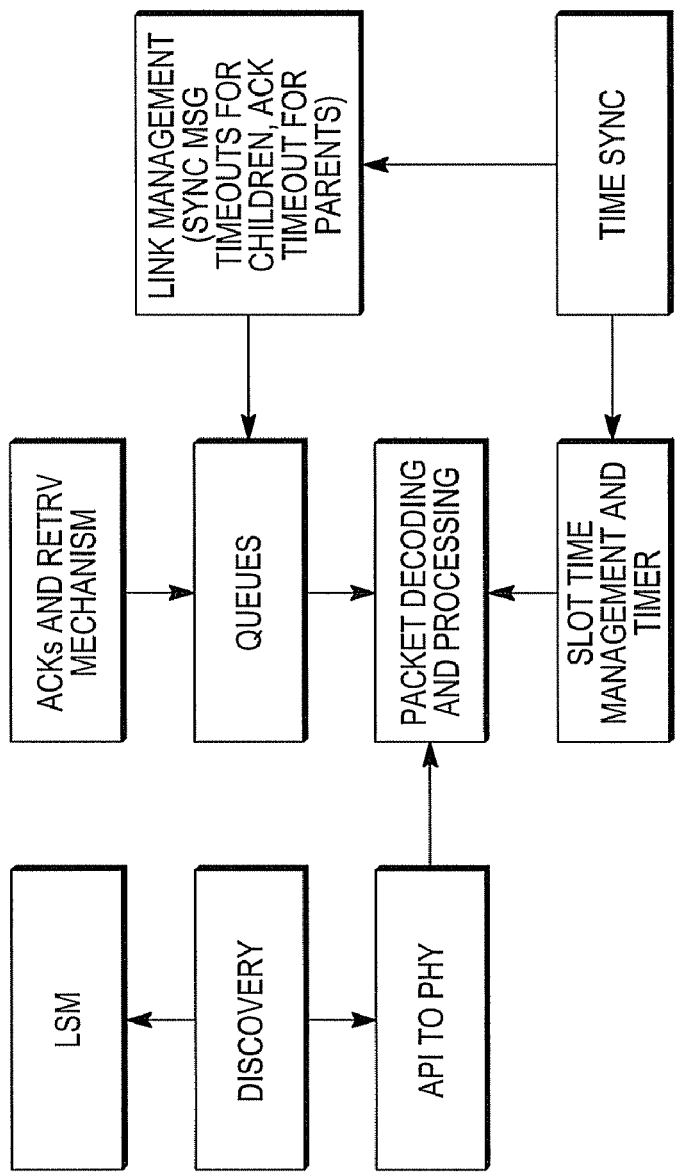
FIG. 4 is a diagram of various software modules that might be present in a detector as in FIG. 1B.
Figure 5:
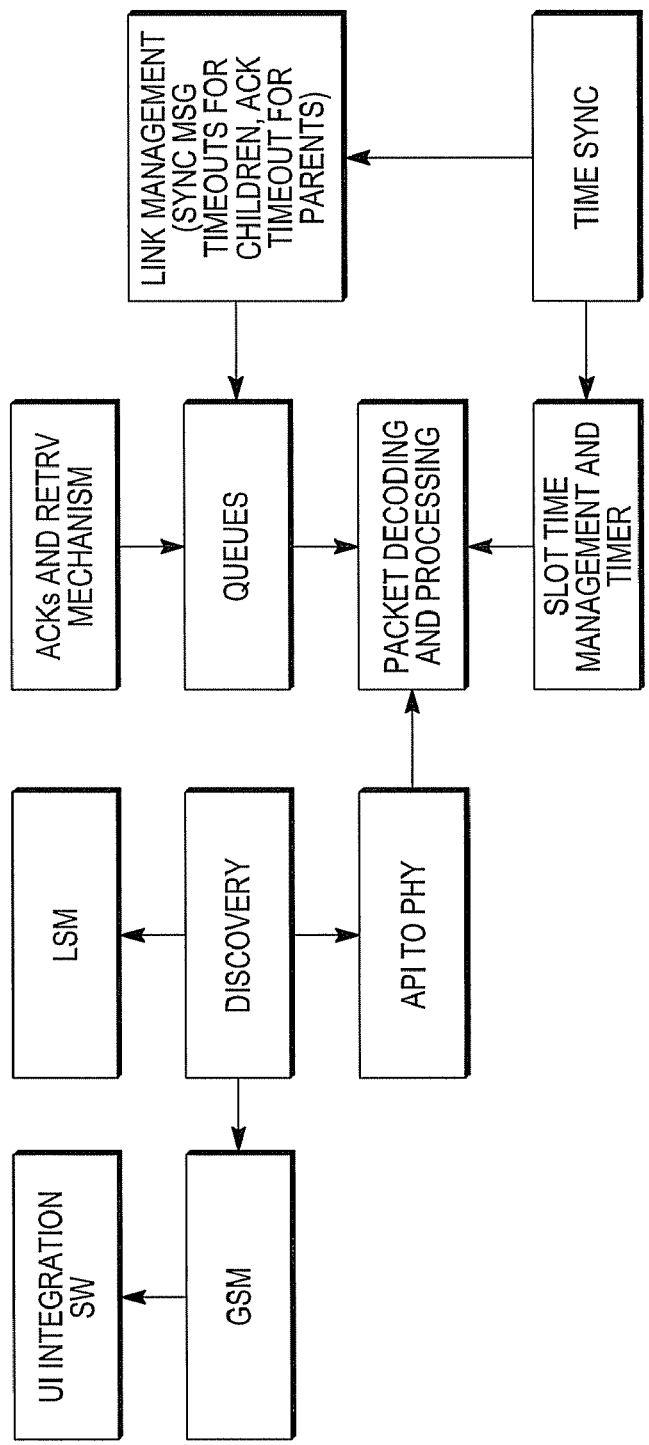
FIG. 5 is a diagram of various software modules that might be present in a control unit or alarm panel in the system of FIG. 1A.

FIG. 4 illustrates additional aspects of exemplary input or output device software modules. FIG. 5 illustrates additional aspects of control unit or panel 20 software modules.

It can be seen that the end to end communication delay i.e. detection to activation delay is function of maximum number of devices in the network. This is because slot size is function of Long data packet size and Long data packet needs to accommodate data from all devices in the network. The detection to activation delay is defined by regulatory bodies which can be very stringent in some countries. The network can be made adaptive to the end-to-end delay in such a way that it adapts to the requirement by automatically defining the network size for given end-to-end delay.

In this case, the panel node is either informed of total maximum size of network (capacity) or of maximum permissible end to end delay over the network. In the former case, the operator has to manually calculate the capacity and feed to the panel using user interface. In the later case the panel determines Frame duration, slot size & number of slots that can be accommodated in Request and Response phase from the end-to-end latency requirement. The capacity of network which is equal to the number of Request and Response phase slots, is calculated in following manner:

a) Frame size=permissible end-to-end delay
b) Request phase duration
  =Response phase duration
  =½×(Frame size−silence phase duration).

Here the Silence phase duration is constant for given panel implementation.

c) Number of slots=capacity
  =Request phase duration/
  (maximum Packet size+slot overheads);

Here slot overheads include all time components of the Tx slot (such as drift compensation time, ACK reception time, etc.) other that Packet transmission time. The slot overheads are constant for a given implementation.

d) maximum Packet size=(capacity×per node payload size)+headers+footers

Here header and footer sizes are constant.

The capacity is obtained by simultaneously solving equations in step c and step d.

The slot duration is adjusted for timer tick resolution so that all nodes can be synchronized for operation based on the slot duration.

The network nodes need to be aware of the network capacity so as to use appropriate slot sizes and Request-Response phase durations. The network capacity is configured into all nodes before commissioning. The capacity is stored in all nodes' non-volatile memory for use during normal operation. All nodes of capacity adaptive network have ability to calculate slot size, Request-Response phase durations and super-frame durations from given capacity.

Operation of the adaptive capacity network is similar to the basic network except that panel 12 maintains the network size within limits. When the network reaches the capacity limit, the panel informs the network nodes to respond to new nodes with a Capacity Full message. This message informs new nodes not to try to join the network. The user can also be informed about the error by using a predefined LED blinking sequence on the new device and on the fire panel user interface 12e, if available. Thus the new nodes are blocked from entering the network after the estimated capacity is reached.

In another embodiment, the capacity of the network can be dynamically adapted to the number of devices of the network to give the best possible end-to-end delay performance. When number of nodes in a given network is less than configured capacity, the panel can optimize network performance by configuring network capacity close to the actual number of nodes. If a network of capacity n has n−10 nodes, the panel will configure the network as an n—10 capacity network. By configuring the network to work at present capacity, length of these implicitly addressed fields is reduced and hence that of the packet. The reduced packet size reduces the power consumption of the node thereby improving battery life.

The reduced packet size leads to reduced slot size & reduced Frame duration. The end-to-end latency, which is equal to Frame duration, also gets optimized for present number of nodes. The latency of such adaptive capacity network is better than full capacity network.

The panel coordinates this dynamic capacity adaptation process. It always keeps track of number of currently associated nodes & selects the next higher capacity step than present number of nodes in the network. The capacity steps are pre-defined in order to have practically possible slot and Frame durations. For example, a network may use capacity steps in multiples of 5. When the network contains 7 nodes, it will be adapted to have capacity of 10. When number of nodes in the network reaches 10 the capacity will be dynamically changed to 15.

When panel dynamically changes the capacity, it informs all established nodes of the network about the new capacity by sending a broadcast 'capacity change' command message during Response phase. This message also carries the effective super-frame number. All nodes of established network calculate the slot & Frame durations corresponding to the new capacity and start using them from indicated Frame.

To help newly joining nodes understand the current network capacity, the time sync field of Health or other messages which is used for time synchronization includes a field indicating present network capacity. The new node configures the slot size and Frame duration accordingly and completes the remaining association steps while maintaining synchronization with the network.

At the end of commissioning phase, which is indicated using the user interface 12e or otherwise, the panel 12 checks the number of nodes for adapting the network for current size for the first time. From this instant the capacity is dynamically changed to next higher or lower level after every addition and removal of node(s) based on resulting number of nodes in the network.

Operation of dynamic adaptive capacity network is similar to basic network described above except that panel adapts the capacity according to present number of nodes in the network and also maintains the network size within limits.

All nodes in the network change the capacity as instructed by the panel using 'Capacity Change' command at the beginning of indicated Frame.

When the network reaches the capacity limit, the panel 12 informs the network nodes to respond to new nodes with a 'Capacity Full' message. This message informs new nodes not to try to join the network. The user is also informed about the error by using a predefined LED blinking sequence on the new device and on the fire panel user interface 12e, if available. Thus the new nodes are blocked from entering the network.

Those of skill will understand that the present wireless network can include or be part of a wired monitoring system without departing from the spirit and scope of the invention. Similarly, neither the number or type of input devices, nor the number or types of output devices are limitations of the invention.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims. Thought this invention is explained with reference to a fire system, it can be used for any application having similar communication requirements.

The invention claimed is:

1. A wireless communications system comprising:
a control unit which includes a wireless transceiver and control software to implement a wireless multi-hop communications protocol; and
a plurality of wireless devices where each device includes software to implement the wireless communication protocol with one of, the control unit and at least one other child member of the plurality, or, at least two other members of the plurality where a selected device communicates with at least one child device and at least one parent device,
wherein each child device includes software that implements the protocol with one of, two parent devices, or, one parent device and the control unit,
wherein information from different child devices is transmitted to respective parent devices
wherein each of the respective parent devices aggregates parent data with the information received from the different child devices, and
wherein each of the respective parent devices transmits a single packet with the aggregated parent data and information from the different child devices and
where at least some of the devices become active for a predetermined time interval during selected time slots to receive incoming data, and in the absence thereof, return to an inactive state.

2. A system as in claim 1 where the child devices include software to transmit messages, on a time slot basis, before the respective parent's transmission time slot.

3. A system as in claim 1 where the devices include software to transmit messages, on a time slot basis to at least two parent devices and where if one parent fails, transmission continues with the other parent and where a replacement parent is also sought.

4. A system as in claim 1 wherein commands from respective parent devices are received, separated and sent to respective child devices.

5. A wireless ambient condition detecting system comprising:
a control unit which includes a wireless transceiver and control software to implement a wireless multi-hop communications protocol; and
a plurality of devices where each device includes software to implement the wireless communication protocol with one of, the control unit and at least one other child member of the plurality, or, at least two other members of the plurality where a selected device communicates with at least one child device and at least one parent device,
wherein each child device includes software that implements the protocol with one of, two parent devices, or, one parent device and the control unit,
wherein alarm/status information from different child devices is transmitted to respective parent devices,
wherein each of the respective parent devices aggregates parent data with the alarm/status information received from the different child devices, and
wherein each of the respective parent devices transmits a single packet with the aggregated parent data and alarm/status information from the different child devices and
where at least some of the devices become active for a predetermined time interval during selected time slots to receive incoming data, and in the absence thereof, return to an inactive state.

6. A system as in claim 5 where the plurality includes output devices, and, where the output devices are selected from a class which includes at least visual output devices, and audible output devices.

7. A system as in claim 6 where the input devices are selected from a class which includes at least smoke detectors, gas detectors, thermal detectors, fire detectors, flow detectors, pull boxes, position detectors and motion detectors.

8. A system as in claim 7 where at least some of the devices include at least one ambient condition input device and at least one visual or audible output device.

9. A system as in claim 5 where the devices include software to transmit a command, on a time slot basis, to a plurality of child devices.

10. A system as in claim 5 where the devices include software to transmit responses, on a time slot basis to at least two parent devices.

11. A system as in claim 5 which includes circuitry to automatically, or, otherwise adjust at least one of time slot duration, or, packet size.

12. A system as in claim 11 where members of the plurality include circuitry that receives and rebroadcasts the frames to other members of the plurality.

13. A system as in claim 12 where at least some of the frames include a request section directed to members of the plurality, at least some members of the plurality include second circuitry responsive to a detector specific request in the request section.

14. A system as in claim 5 wherein commands from each of the respective parent devices are received, split and sent to respective child devices.

15. A system as in claim 11 which includes a frequency varying process.

* * * * *